United States Patent [19]

Ando

[11] Patent Number: 4,653,729
[45] Date of Patent: Mar. 31, 1987

[54] FOOT WARMER FOR USE IN CAR

[75] Inventor: Yutaka Ando, Toyoake, Japan

[73] Assignee: Sumitomo Light Metal Industries, Ltd., Tokyo, Japan

[21] Appl. No.: 768,001

[22] Filed: Aug. 21, 1985

[51] Int. Cl.$^4$ .................................................. B60H 1/02
[52] U.S. Cl. ........................... 237/12.3 B; 237/12.3 R; 237/69; 237/43; 165/42; 165/46
[58] Field of Search ...................... 237/12.3 B, 12.3 R, 237/77, 69, 43; 165/46, 42; 126/204

[56] References Cited

U.S. PATENT DOCUMENTS

| 932,113 | 8/1909 | Field | 237/12.3 B |
|---|---|---|---|
| 1,369,809 | 3/1921 | Hettinger | 237/12.3 B |
| 3,037,746 | 6/1962 | Williams | 237/69 |
| 4,212,348 | 7/1980 | Kobayashi | 237/69 |

Primary Examiner—Henry A. Bennet
Attorney, Agent, or Firm—Flynn, Thiel, Boutell & Tanis

[57] ABSTRACT

The present invention provides a foot warmer for use in a car which is located at the floor of the car, the footwarmer comprises a concave groove formed in a meandering form on one surface of a heat insulating material; a heat radiating sheet connected to the surface on which the groove is formed; and a tube disposed in the groove so as to transfer the heat of water flowing therein to the heat radiating sheet, wherein cooling water is heated by an engine and then is circulated through the tube into the foot warmer. In the foot warmer, although the groove may be provided in a meandering form, a plurality of parallel spaced grooves may be also formed on the heat insulating material in place of the meandering groove. In this case, the tube has portions exposed from the sides of the heat insulating material and, at the portions, is bent in a U-shaped form. In such an arrangement, the foot warmer can be well fitted onto various types of cars and moderately warm the lower area near the feet in the cars without excessively warming the upper area.

7 Claims, 7 Drawing Figures

FOOT WARMER FOR USE IN CAR

BACKGROUND OF THE INVENTION

The present invention relates to foot warmers especially suited for use in cars and more particularly to foot warmers capable of warming drivers' feet or passengers' feet without excessively heating their heads.

There have been heretofore known two types as heating sources of car heating equipments, namely, one being a hot-water heating type and the other one being a exhaust steam heating type. The foot warmer of the present invention is directed to the former type.

Generally, in the hot-water heating type car heater system, a cooling water is heated by the engine and the heat of the coiling water is transferred to the air by a heat exchanger. The thus heated hot-air is blown from the nozzle of a car heater into the passenger compartment of a car.

Although conventional car heating arrangements, such as car heaters or car air-conditioners, emit hot-air heated well enough from their nozzle into a car passenger compartment, the air does not fully mix with cool air in the car. Thus, even if the temperature of the hot-air being blown from the car heater or air-conditioner is at high temperatures of 40° to 50° C., air in the car can not be uniformly heated. More specifically, the top or upper part of the car is undesirably excessively heated in a short time, while the lower part near the passengers' or drivers' feet can not readily be heated ro a required temperature. Thus, the known car heater or air-conditioner can not be considered ideal because of such disadvantageous phenomenon. Further, in a car, seats, passengers and so forth block the the convection of air. In addition, a car passenger compartment is surrounded with walls, and windows, allowing the escape or radiation of a large quantity of heat. These factors make it difficult to uniformly heat air in the car. If the rotating rate of a blower or fan and the quantity of hot air being blown off from a car heater are increased in order to increase the heating efficiency, unpleasant noise is not only increased, but also the increased noise gives a unwanted effect to specially equipped car audio system or the like. In addition, increasing the temperature of air blown from the nozzle of a car heater further increases the tendency to cause the above undesirable local excessive heating at the upper part, thereby only the part near the heads and faces of driver or passengers gets too hot, while the other lower parts near their feet are left cool. Thus, such conventional car heaters or car air-conditioners can not give satisfactory service and, particularly, in the case of a long-distance drive in a cold district in winter, great difficulties are presented.

SUMMARY OF THE INVENTION

It is therefore an object of the present invention to provide a foot warmer highly suited for use in a car in which the disadvantages experienced in the foregoing conventional car heaters or car air-conditioners are eliminated.

More specifically, the present invention is directed to a car foot-warmer in which a cooling water is heated by the engine and then is forced into the foot warmer located under the feet thereby passengers' or driver's feet are warmed by gentle radiation or convection heating.

According to the present invention, there is provided a foot-warmer for use in cars which is equipped at the floor of the car, the foot-warmer comprising a concave groove formed in a meandering form on one surface of a heat insulating material; a heat radiating sheet connected onto the surface on which the groove is formed; and a tube arranged in a meandering form in the groove so as to transfer the heat of water flowing therein to the heat radiating sheet, wherein a cooling water is heated by the engine and then is circulated through the tube into the foot warmer. In the foot warmer, although the groove may be provided in a meandering form, a plurality of parallel spaced grooves may be formed on the heat insulating material in place of the meandering groove. In this case, the tube has portions exposed from the sides of the heat insulating material and, at the portions, is bent into a U-shaped form. As an embodiment of the present invention, the heat radiating sheet has a groove or grooves corresponding to the groove or grooves of the heat insulating material and is fitted onto the latter groove or grooves. Also, as an alternate embodiment, a heat transfer sheet is fitted onto the groove or grooves of the heat insulating material and a plane heat radiating sheet may be put onto the heat insulating material so as to cover the groove or grooves of the heat insulating material.

The above foot warmer can warm gently the lower part near the feet in a car and thereby provide a comfortable drive to drivers or passengers even if in a cold district in winter. Although the foot warmer can be used singly, it can be also in combination with known heating system, if necessary, and, in such a case, the temperature of hot air blown off from the conventional heater can be substantially reduced and the speed of the fan is not required to be increased. Thus, unpleasant noise will not be caused. In addition, the foot warmer can be readily fitted to various types of cars and can be manufactured with ease.

DETAILED DESCRIPTION OF THE PREFERRED EMBODIMENTS

Now, the preferred embodiments of the present invention will be described in detail by referring to the accompanying drawings.

Figure 1:
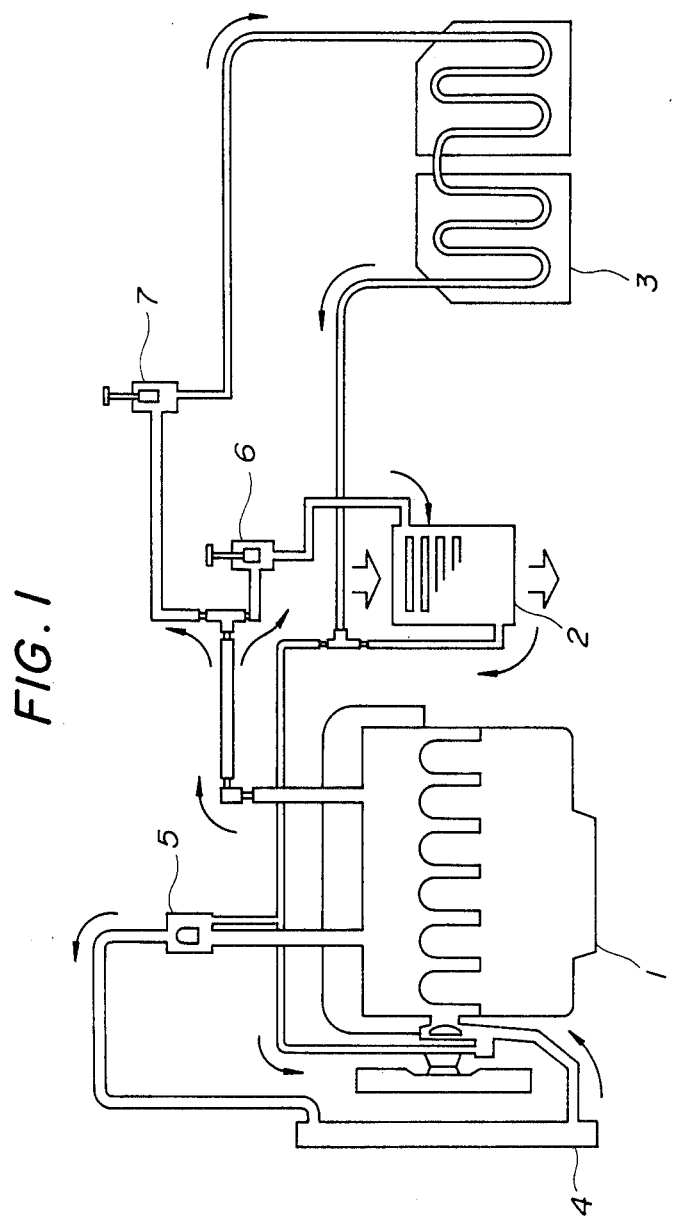
FIG. 1 is a diagrammatical view illustrating a car heating arrangement including a foot warmer of the present invention.

FIG. 1 is a diagram illustrating a car heating arrangement including a foot warmer of the present invention equipped at the floor of a car. In this drawing, reference numerals 1, 2 and 3 designate, respectively, an engine, a heater core and the invention foot warmer. Cooling water from the radiator 4 cools the engine 1, then returns through a radiator thermostat 5 to the radiator 4.

Thereafter, this water is cooled again at the radiator 4 and circulated again to cool the engine 1. When such a cooling water at the engine 1 is used as a heating source, usually a hot-water cock 6 is opened to cause a high temperature cooling-water heated at the engine 1 to flow into a heat echanger core 2 for heat exchange and feed hot air into the passenger compartment of a car. In the invention, although only a hot-water cock 7 may be opened to introduce the hot water into the foot warmer 3, these two cocks 6 and 7 may be simultaneously opened in order to introduce a high temperature cooling-water into both of the invention foot warmer 3 and the car heater core 2. Also, a further valve may be provided in order to allow a foot warmer to warm the front seat side for a driver and the rear seat side for passengers, individually. The foot warmer 3 can be arranged in a parallel relation with respect to the heater core 2 and cooling water introduced into the heater core 2 and the foot warmer 3 goes back directly to the engine 1.

Figure 2:
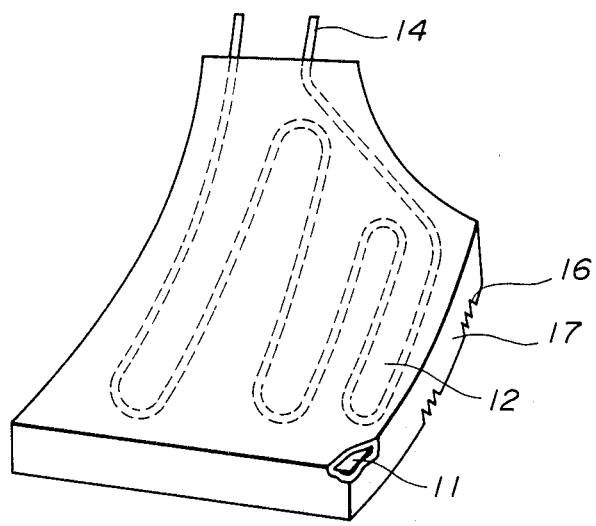
FIG. 2 is a perspective view, partly broken away, showing the foot warmer according to one embodiment of the present invention.
Figure 3:
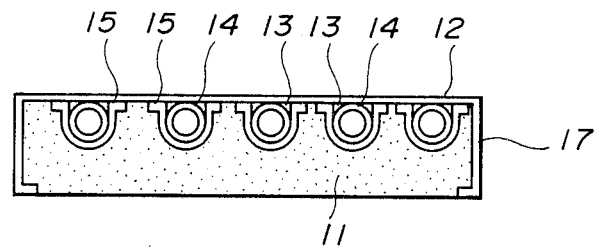
FIG. 3 is a sectional view of the foot warmer shown in FIG. 2.

The present invention is directed to such a hot-water heating type foot warmer and shown as an preferred embodiment in FIGS. 2 and 3.

Figure 4:
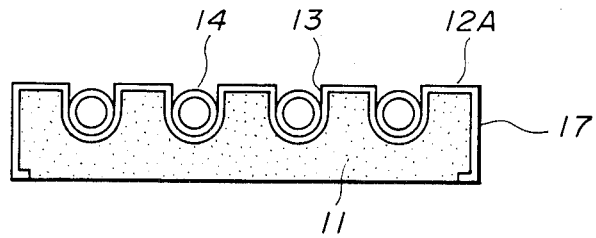
FIG. 4 is a sectional view of a modified form of the foot warmer shown in FIG. 2.

As shown in the these drawings, a heat insulating material 11, which is formed into such a shape that it can be closely fitted to the floor of a car, is covered with a planar heat radiating sheet 12. In the heat insulating material 11, a groove 13 comprising parallel parts and U-shaped curved parts are formed in a meandering form and a tube 14 are placed along the form of the grooves 13. Prior to placing the tube 14, heat transfer sheets 15 are fitted onto the groove 13 in such a manner that heat can be transferred from the heat transfer sheet 15 to the heat radiating sheet 12. To this heat transfer purpose, the heat transfer sheets 15 are connected to the heat radiating sheet 12 at their both ends and heat transfer is caused from both ends of the former members to the latter member. In the foot warmer 3 set forth above, although the heat radiating sheet 12 is planar, a heat radiating sheet 12A as shown in FIG. 4 can be also used. The heating radiating sheet 12A has a concave portion so as to well fit to the groove 13 formed in the heat insulating material 11 and the tube 14 is placed on the heating radiating sheet 12A in the concave groove 13.

Since the floor of a car is widely different in its size and shape depending on the type of a car and the fore part of the floor is generally upwardly inclined, it is difficult to closely set a foot warmer having a fixed configuration or size onto the floor. For instance, a small-sized foot-warmer can be relatively easily fixed to various types of cars, but heating is limited to a narrow area. Thus, for example, when passengers stretch their feet, their feet can not be sufficiently warmed. On the other hand, a large foot warmer can not be successfully arranged. In view of the above, foot warmers capable of being closely fitted to various types of cars are required and, as the result of our further detailed studies, it has been found that such requirements can be satisfied by forming spaced parallel grooves 13A, as shown in FIG. 5, in place of the serpentine groove 13, shown in FIG. 2.

Figure 5:
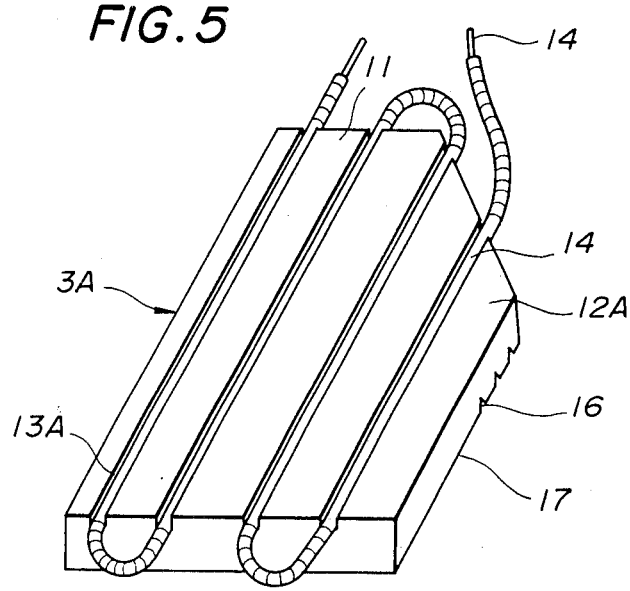
FIG. 5 is a perspective view, partly broken away, showing the foot warmer according to a further embodiment of the present invention.
Figure 7:
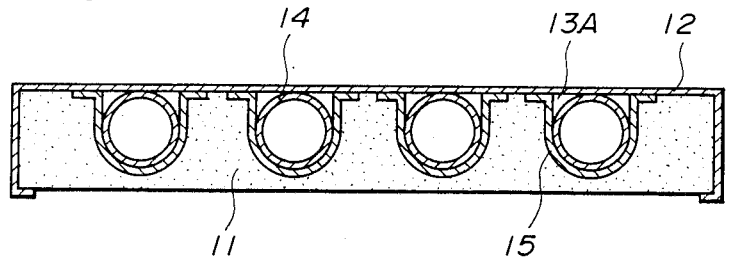
FIG. 7 is a sectional view of a modified form of foot warmer shown in FIG. 5.

FIG. 5 is a perspective view of an alternate foot-warmer 3A in which plural grooves 13A are formed on one surface of the heat insulating material 11, and a heat radiating sheet 12A is bonded onto the surface and the lateral faces of the heat insulating material 11. In the grooves 13A, a tube 14 made of flexible synthetic resin is placed in a serpentine form, as shown in FIG. 5. The tube 14 has portions extended out from the grooves 13A and, at the portions, is curved in a U-shape form to enter the next groove 13A. The exposed portion of the flexible tube 14 may be protected by covering them with a flexible tube. In the foot warmer 3A, the heat radiating sheet 12A having grooves corresponding to the parallel grooves 13A is used, but a plane heat radiating sheet 12 may be employed with the transfer sheet 15, as shown in FIG. 7. As illustrated in FIG. 7, the heat transfer sheet 15 is bonded onto the surface of the grooves 13A and the tube 14 is placed thereon. The planar heat radiating sheet 12 is arranged in such a manner that the grooves are closed with the heat radiating sheet 12 and heat can be transferred from the heat transfer sheet 15 to the heat radiating sheet 12.

In the foot warmer set forth above, notches 16 may be made on the flange face 17 of the heat radiating sheet 12 or 12A so as to allow deformation of the heat radiating sheet 12 or 12A depending on the surface state of the floor.

As the thickness of the heat insulating material 11, about 8 to 12 mm is enough for the intended use and this thickness range does not cause any interference in driving operation. As the heat insulating material 11, foamed resins, foamed gums, foamed synthetic gums, etc may be employed and polyethylene, polypropylene, polyvinyl chloride, polyvinylidene chloride, polystyrene, polyacrylate, polymethacrylate, polyurethane, ethylene-vinyl acetate copolymer, ethylene-propylene copolymer, etc. are exemplified as the foamed resins.

As the heat radiating sheet 12 or 12A, various materials having a high heat transfer property and a small heat capacity can be used and, for example, thin sheets such as aluminum sheet or iron sheet can provide satisfactory service.

The tube 14 may be formed from a synthetic resin or metal and its inside diameter of 5 to 8 mm is enough for the intended use. Particularly, when a flexible tube is desired, a cross-linked polyethylene may be used as a preferable tubing material.

Further, foils or thin sheets of tin, aluminum, etc. are employed as the heat transfer sheet 15 and the transfer sheet 15 is, as set forth above, connected to the heat radiating sheet 12A.

Figure 6:
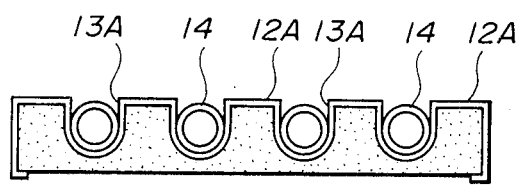
FIG. 6 is a sectional view of the foot warmer shown in FIG. 5.

In practical use, the foot warmer 3 or 3A is located so as to position the U-shape turning portions of the tube 14 longitudinally with respect to the floor. Further, in the foot warmer related to FIGS. 5 to 7, since the tube 14 is bent into a U-shape just at the portions which are liable to be bent, the foot warmer 3 or 3A of the present invention can be wellfitted to the floors of various types of cars by bending the U-shaped turning portions depending on the floor size. Thus, the foot warmer 3 or 3A can be applied to various types of cars. Further, since passengers move their feet back and forth, the foot warmer is not needed to be so wide and the entire length thereof can be reduced by arranging the tube 14 longitudinally with respect to the heat insulating material 11.

In the actual service of the foot warmer, it is covered with a car floor mat or carpet cut into an appropriately size. When the hot-water cock is opened, hot water heated by the engine is forced into the foot warmer 3 or 3A by a/pump arranged near the engine 1 and the heat radiating sheet 12 or 12A is heated by the hot water, thereby heating moderately the area near the feet by radiation or convection of heat. If in this heating process, the surface temperature of the floor mat or carpet is kept within the range of 25° to 35° C. by appropriately controlling the hot-water cock, passengers feel fully warm, even if the temperature in the car is 5° to 20° C. When the outside of a car is very cold and the inside of the car can not be fully heated only by using the invention foot-warmer, conventional heating devices, such as car heater or car conditioner, are used together with it. In this case, the temperature of air from these conventional heaters can be reduced by 5° to 15° C. as compared with the case of heating only by conventional heating apparatus and it is not needed to increase the rotation rate of a fan, thereby unpleasant noise can be substantially reduced.

Further, since the foot warmer can be closely fitted along the floor face and its thickness can be reduced by incorporating the tube into the heat insulating material, it can be arranged in a good appearance under a floor mat or carpet. Further, the foot warmer of the present invention can be readily manufactured.

What is claimed is:

1. A foot warmer for use in a car, comprising: an elongated layer of foamed, synthetic resin, heat insulating material which is generally rectangular in cross-section, said layer having an upper surface, a bottom surface and side surfaces and having groove means in its upper surface; flexible, synthetic resin tube means received in said groove means so that hot engine coolant liquid can be circulated therethrough; a heat radiating sheet having an upper wall and sidewalls covering the upper and side surfaces of said layer, respectively, substantially the entire bottom surface of said layer being uncovered and exposed, said sidewalls of said sheet having spaced-apart notches in the lower edges thereof so that the foot warmer can be deformed to conform to the shape of the floor of a car.

2. A foot warmer for use in an automobile wherein said foot warmer is adapted to be capable of flexing for installation on the floor of the automobile in close conformity with the shape of said floor, said foot-warmer comprising a layer of heat insulating material having a plurality of spaced-apart parallel grooves formed on one surface thereof; a heat radiating sheet attached to the surface in which the grooves are formed; and a tube arranged in the grooves so as to transfer the heat of water flowing therein to said heat radiating sheet, said tube having reversely bent U-shaped portions extending beyond the ends of said layer of heat insulating material so that said U-shaped portions can be bent and fitted to the floor of the car, wherein engine coolant is heated by an engine and then is circulated through said tube of the foot warmer to effect heat exchange therefrom.

3. A foot warmer as claimed in claim 1 in which said heat radiating sheet has a groove means corresponding to said groove means formed on said heat insulating material and is fitted into said groove means.

4. A foot warmer as claimed in claim 1 in which said heat radiating sheet is planar and is disposed over said layer of heat insulating material so as to cover said groove means therewith and in which a heat transfer sheet is connected to said heat radiating sheet and is fitted into said groove means in such a manner that heat can be transferred from said tube means to said heat transfer sheet and thence to said heat radiating sheet.

5. A foot warmer as claimed in claim 2 in which said heat radiating sheet has grooves corresponding to and fitted into said grooves formed on said heat insulating material.

6. A foot warmer as claimed in claim 4 in which said heat radiating sheet is planar and is disposed over said heat insulating material so as to cover said grooves therewith and in which a heat transfer is fitted into said grooves in such a manner that heat can be transferred from said heat transfer sheet to said heat radiating sheet.

7. A foot warmer as claimed in claim 2, in which said heat insulating material is a foamed synthetic resin and said tube is flexible and is made of synthetic resin.

* * * * *

UNITED STATES PATENT AND TRADEMARK OFFICE
CERTIFICATE OF CORRECTION

PATENT NO. : 4,653,729

DATED : March 31, 1987

INVENTOR(S) : Yutaka ANDO

It is certified that error appears in the above-identified patent and that said Letters Patent is hereby corrected as shown below:

Column 6, line 31; change "claim 4" to ---claim 2---.

Signed and Sealed this

Twenty-fifth Day of August, 1987

Attest:

DONALD J. QUIGG

Attesting Officer

Commissioner of Patents and Trademarks